(12) United States Patent
Kasai et al.

(10) Patent No.: US 11,288,886 B2
(45) Date of Patent: Mar. 29, 2022

(54) PEOPLE-GATHERING ANALYSIS DEVICE, MOVEMENT DESTINATION PREDICTION CREATION DEVICE, PEOPLE-GATHERING ANALYSIS SYSTEM, VEHICLE, AND RECORDING MEDIUM

(71) Applicant: OMRON Corporation, Kyoto (JP)

(72) Inventors: Kazuki Kasai, Setagaya (JP); Koichi Aida, Yokohama (JP); Tomonari Imabayashi, Setagaya (JP); Eizo Kitamura, Kasugai (JP); Hideto Ohmae, Nagoya (JP); Atsushi Sakuma, Nagoya (JP); Minoru Fujino, Toyonaka (JP)

(73) Assignee: OMRON Corporation, Kyoto (JP)

( * ) Notice: Subject to any disclaimer, the term of this patent is extended or adjusted under 35 U.S.C. 154(b) by 137 days.

(21) Appl. No.: 16/757,425

(22) PCT Filed: Oct. 29, 2018

(86) PCT No.: PCT/JP2018/040149
§ 371 (c)(1),
(2) Date: Apr. 20, 2020

(87) PCT Pub. No.: WO2019/088031
PCT Pub. Date: May 9, 2019

(65) Prior Publication Data
US 2020/0342239 A1    Oct. 29, 2020

(30) Foreign Application Priority Data
Nov. 2, 2017 (JP) .............................. JP2017-212714

(51) Int. Cl.
*G06K 9/00* (2022.01)
*G01C 21/36* (2006.01)
(Continued)

(52) U.S. Cl.
CPC ......... *G06V 20/53* (2022.01); *G01C 21/3617* (2013.01); *G06V 40/23* (2022.01)

(58) Field of Classification Search
CPC ........... G06K 9/00778; G06K 9/00342; G01C 21/3617
See application file for complete search history.

(56) References Cited

U.S. PATENT DOCUMENTS

2013/0287261 A1   10/2013   Lee et al.
2015/0227965 A1*   8/2015   Drysch .............. G06K 9/00791
                                                      705/14.45

FOREIGN PATENT DOCUMENTS

| CN | 101399731 | 4/2009 |
| CN | 102402852 | 4/2012 |

(Continued)

OTHER PUBLICATIONS

"International Search Report (Form PCT/ISA/210) of PCT/JP2018/040149", dated Jan. 22, 2019, with English translation thereof, pp. 1-2.

(Continued)

*Primary Examiner* — David F Dunphy
(74) *Attorney, Agent, or Firm* — JCIPRNET

(57) ABSTRACT

The disclosure provides a people-gathering analysis device including: a position information acquisition unit (112) that acquires position information of a moving body (150); a moving-body outside information acquisition unit (111) that acquires information about the area outside the moving body (150); and a people-gathering information calculation unit (113) that calculates people-gathering information indicating the gathering of people by referring to the position information of the moving body (150) acquired by the position information acquisition unit (112), and the information about the area outside the moving body (150)

(Continued)

acquired by the moving-body outside information acquisition unit (111).

8 Claims, 4 Drawing Sheets

(51) Int. Cl.
    *G06V 20/52*     (2022.01)
    *G06V 40/20*     (2022.01)

(56) References Cited

FOREIGN PATENT DOCUMENTS

| | | |
|---|---|---|
| CN | 103065462 | 4/2013 |
| CN | 103155015 | 6/2013 |
| CN | 104021668 | 9/2014 |
| JP | 2003288687 | 10/2003 |
| JP | 2007072784 | 3/2007 |
| JP | 2016152000 | 8/2016 |
| JP | 2017174203 | 9/2017 |
| KR | 101768210 | 8/2017 |

OTHER PUBLICATIONS

"Written Opinion of the International Searching Authority (Form PCT/ISA/237) of PCT/JP2018/040149", dated Jan. 22, 2019, with English translation thereof, pp. 1-6.

"Office Action of Japan Counterpart Application", dated Dec. 5, 2017, with English translation thereof, p. 1-p. 5.

"Search Report of Europe Counterpart Application", dated Jul. 14, 2021, p. 1-p. 10.

"Office Action of China Counterpart Application" with English translation thereof, dated Sep. 1, 2021, p. 1-p. 17.

* cited by examiner

|  | Area A | Area B | Area C | Area D | Area E |
|---|---|---|---|---|---|
| Number of people | 20 | 40 | 20 | 40 | 80 |
| Vehicle allocation ratio (%) | 10 | 20 | 10 | 20 | 40 |
| Number of vehicles to be allocated | 1 | 2 | 1 | 2 | 4 |

FIG. 3

|  | Area A | | Area B | | Area C | | Area D | | Area E | |
|---|---|---|---|---|---|---|---|---|---|---|
|  | Adults | Children | Adults | Children | Adults | Children | Adults | Children | Adults | Children |
| Number of people | 15 | 5 | 30 | 10 | 15 | 5 | 15 | 25 | 20 | 60 |
| Weight index | 35 | | 70 | | 35 | | 55 | | 100 | |
| Vehicle allocation ratio (%) | 12 | | 24 | | 12 | | 18 | | 34 | |
| Number of vehicles to be allocated | 6 | | 12 | | 6 | | 9 | | 17 | |

FIG. 4

PEOPLE-GATHERING ANALYSIS DEVICE, MOVEMENT DESTINATION PREDICTION CREATION DEVICE, PEOPLE-GATHERING ANALYSIS SYSTEM, VEHICLE, AND RECORDING MEDIUM

CROSS-REFERENCE TO RELATED APPLICATION

This application is a 371 application of the International PCT application serial no. PCT/JP2018/040149, filed on Oct. 29, 2018, which claims the priority benefit of Japan Patent Application No. 2017-212714, filed on Nov. 2, 2017. The entirety of each of the above-mentioned patent applications is hereby incorporated by reference herein and made a part of this specification.

TECHNICAL FIELD

The disclosure relates to a people-gathering analysis device, a movement destination prediction creation device, a people-gathering analysis system, a vehicle, and a people-gathering analysis program.

RELATED ART

Conventionally, there is known a technique of allocating a bus or a taxi based on the number of people waiting at specific places such as bus stops or taxi stands (for example, see Patent Document 1).

PRIOR-ART DOCUMENTS

Patent Documents

Patent Document 1: Japanese Laid-open No. 2017-174203 (published on Sep. 28, 2017)

SUMMARY OF THE INVENTION

Problems to be Solved by the Invention

However, in the related art as described above, only the number of people waiting at the specific places such as bus stops or taxi stands can be grasped. On the other hand, there has been a demand for detecting the need elsewhere than at the specific places such as bus stops or taxi stands.

Therefore, an object of an aspect of the disclosure is to realize a technology capable of detecting a gathering of people elsewhere than at specific places.

Means for Solving the Problems

In order to solve the above problems, a people-gathering analysis device according to an aspect of the disclosure includes: a position information acquisition unit, acquiring position information of a moving body; a moving-body outside information acquisition unit, acquiring information outside the moving body; and a people-gathering information calculation unit, calculating people-gathering information indicating a gathering of people with reference to the position information of the moving body acquired by the position information acquisition unit and the information outside the moving body acquired by the moving-body outside information acquisition unit.

According to the above configuration, a gathering of people elsewhere than at specific places can be detected.

In order to solve the above problems, in a people-gathering analysis device according to a second aspect of the disclosure, the people-gathering information calculation unit may generate attribute information indicating attributes of each person included in the people-gathering information with reference to the information outside the moving body acquired by the moving-body outside information acquisition unit, and may include the attribute information in the people-gathering information.

According to the above configuration, the attribute information indicating the attributes of the gathering people can be known together with the people-gathering information.

In order to solve the above problems, a people-gathering analysis device according to a third aspect of the disclosure may include a map creation unit, the map creation unit acquiring map information, and displaying on a map indicated by the map information a distribution state of people based on the information acquired from the position information acquisition unit and the moving-body outside information acquisition unit.

According to the above configuration, a gathering position of people other than the specific places and the number of the gathering people can be shown on the map.

In order to solve the above problems, in a movement destination prediction creation device according to a fourth aspect of the disclosure, the moving body may include an outside information acquisition unit acquiring outside information, and the moving-body outside information acquisition unit may acquire the information outside the moving body from the outside information acquisition unit.

According to the above configuration, by the moving body, information outside the moving body can be collected, and a gathering of people elsewhere than at specific places can be detected.

In order to solve the above problems, a movement destination prediction creation device according to a fifth aspect of the disclosure may include a vehicle allocation schedule creation unit creating a movement destination prediction of the moving body from the people-gathering information acquired from the people-gathering analysis device.

According to the above configuration, the movement destination prediction can be created with reference to the information on the gathering of people elsewhere than at specific places.

In order to solve the above problems, a people-gathering analysis system according to a sixth aspect of the disclosure is a people-gathering analysis system including a moving-body outside information acquisition device acquiring information outside a moving body and a people-gathering analysis device. The people-gathering analysis device includes: a position information acquisition unit, acquiring position information of the moving body; and a people-gathering information calculation unit, calculating people-gathering information indicating a gathering of people with reference to the information outside the moving body acquired by the moving-body outside information acquisition device.

According to the above configuration, a gathering of people elsewhere than at specific places can be detected.

In order to solve the above problems, in a people-gathering analysis system according to a seventh aspect of the disclosure, the moving body includes an outside information acquisition unit acquiring outside information, and the moving-body outside information acquisition device acquires the information outside the moving body from the outside information acquisition unit.

According to the above configuration, a vehicle is capable of detecting a gathering of people elsewhere than at specific places.

In order to solve the above problems, a vehicle according to an eighth aspect of the disclosure is the moving body including a people-gathering analysis device.

According to the above configuration, the vehicle is capable of detecting a gathering of people elsewhere than at specific places.

In order to solve the above problems, a program according to a ninth aspect of the disclosure is a people-gathering analysis program for causing a computer to function as a people-gathering analysis device. The people-gathering analysis program causes the computer to function as the position information acquisition unit, the moving-body outside information acquisition unit, and the people-gathering information calculation unit.

According to the above configuration, a gathering of people elsewhere than at specific places can be detected.

Effects of the Invention

According to an aspect of the disclosure, a technology capable of detecting a gathering of people elsewhere than at specific places can be realized.

BRIEF DESCRIPTION OF THE DRAWINGS

FIG. 3 is a diagram showing an example of a movement destination prediction.

FIG. 4 is a diagram showing an example of another movement destination prediction.

DESCRIPTION OF THE EMBODIMENTS

Embodiment 1

Embodiment 1 (hereinafter also written as "the present embodiment") according to an aspect of the disclosure is described below based on the drawings. However, the present embodiment explained below is merely an example of the disclosure in all respects. It goes without saying that various improvements or modifications can be made without departing from the scope of the disclosure. That is, when implementing the disclosure, a specific configuration corresponding to the embodiment may be properly adopted. Moreover, data appearing in the present embodiment are described using a natural language but are more specifically specified by computer-recognizable pseudolanguage, commands, parameters, machine language and so on.

§ 1 Application Example

Figure 1:
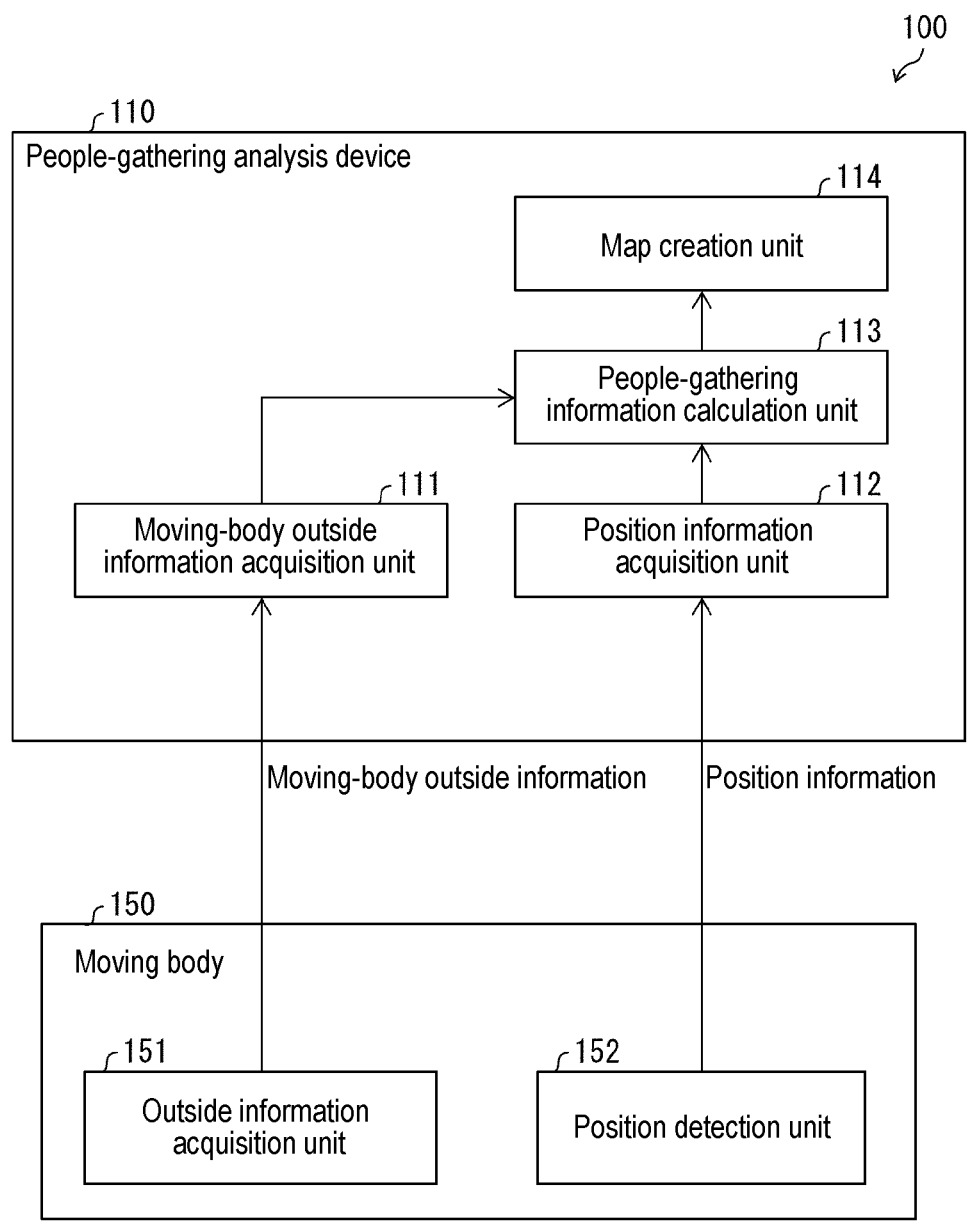
FIG. 1 is a block diagram showing a schematic configuration of a people-gathering analysis system according to Embodiment 1 of the disclosure.

First of all, an example of a situation in which the disclosure is applied is described using FIG. 1. FIG. 1 shows an example of a schematic configuration of a people-gathering analysis system 100 according to the present embodiment. The people-gathering analysis system 100 according to the present embodiment is a system that acquires information outside a moving body 150 by an outside information acquisition unit 151 (for example, light detection and ranging (Lidar) to be described later), and detects a gathering of people elsewhere than at specific places such as bus stops or taxi stands with reference to the information outside the moving body 150 and position information.

As shown in FIG. 1, the people-gathering analysis system 100 includes a position information acquisition unit 112 acquiring the position information of the moving body 150 and a moving-body outside information acquisition unit 111 acquiring the information outside the moving body 150 from the outside information acquisition unit 151 provided in the moving body 150. In addition, the people-gathering analysis system 100 includes a people-gathering information calculation unit calculating, with reference to the position information of the moving body 150 acquired by the position information acquisition unit 112 and the information outside the moving body 150 acquired by the moving-body outside information acquisition unit 111, people-gathering information indicating the gathering of people.

Accordingly, in the present embodiment, the information outside the moving body 150 is acquired from the outside information acquisition unit 151 provided in the moving body 150, and the gathering of people is detected with reference to the information outside the moving body 150 and the position information of the moving body 150. Accordingly, the gathering of people elsewhere than at specific places such as bus stops or taxi stands can be detected.

§ 2 Configuration Example

A configuration of the people-gathering analysis system 100 according to Embodiment 1 of the disclosure is described below in detail.

As illustrated in FIG. 1, the people-gathering analysis system 100 includes a people-gathering analysis device 110 and the moving body 150.

(Configuration of Moving Body 150)

The moving body 150 is a vehicle such as a bus, a taxi, a car, a motorcycle or the like traveling in a city, or a so-called drone such as a multicopter, an unmanned aircraft or the like. The moving body 150 includes the outside information acquisition unit 151 and a position detection unit 152.

The outside information acquisition unit 151 acquires the information outside the moving body 150. For the outside information acquisition unit 151, light detection and ranging (Lidar), which has a function of analyzing a distance to an object or the nature of the object by emitting a pulse of laser light and measuring the returned pulse, can be suitably used. Moreover, the outside information acquisition unit 151 may be configured to acquire the information outside the moving body 150 by not only Lidar but also radar or sonar or a combination thereof.

In this way, since the moving body 150 such as a vehicle or a drone or the like is configured to include the outside information acquisition unit 151, information outside a range corresponding to the movement of the moving body 150 can be acquired, or the moving body 150 can be moved to a desired position to acquire outside information. Accordingly, a gathering of people at any place even not the specific places such as bus stops or taxi stands can be detected.

The outside information acquisition unit 151 transmits moving-body outside information, which is the acquired information outside the moving body 150, to the people-gathering analysis device 110.

The position detection unit 152 includes a GPS antenna, a Wi-Fi® antenna, a compass, an acceleration sensor and the like, and is configured capable of detecting position information such as a direction in which the moving body 150 is directed or the current position of the moving body 150 or the like. The position detection unit 152 transmits the detected position information of the moving body 150 to the people-gathering analysis device 110.

(Configuration of People-Gathering Analysis Device 110)

The people-gathering analysis device 110 includes the moving-body outside information acquisition unit 111, the position information acquisition unit 112, a people-gathering information calculation unit 113 and a map creation unit 114. The people-gathering analysis device 110 is configured capable of communicating with an external machine via wireless communication such as, for example, the Internet.

The moving-body outside information acquisition unit 111 acquires the moving-body outside information output by the outside information acquisition unit 151 of the moving body 150 via, for example, the Internet.

The position information acquisition unit 112 acquires the position information of the moving body 150 output by the position detection unit 152 of the moving body 150 via, for example, the Internet.

With reference to the position information of the moving body 150 acquired by the position information acquisition unit 112 and the information outside the moving body 150 acquired by the moving-body outside information acquisition unit 111, the people-gathering information calculation unit 113 calculates the people-gathering information indicating how many people are gathering at which position. The position information acquisition unit 112 may acquire the position of the moving body 150 from a source other than the position detection unit 152. For example, in the case where the moving body 150 moves while performing wireless communication, the position information of the moving body 150 may be acquired from a wireless communication base station.

Moreover, the people-gathering analysis device 110 may be configured to acquire the moving-body outside information and the position information from each of a plurality of moving bodies 150. Then, with reference to the position information of each of the moving bodies 150 acquired by the position information acquisition unit 112 and the information outside each of the moving bodies 150 acquired by the moving-body outside information acquisition unit 111, the people-gathering information calculation unit 113 may calculate how many people are gathering at each of the positions as the people-gathering information.

According to these configurations, from the moving body 150 such as a vehicle such as a bus, a taxi, a car, a motorcycle the like traveling in a city, or a so-called drone such as a multicopter, an unmanned aircraft or the like, the information of the surroundings of the moving body 150 is acquired and a gathering of people is detected. Accordingly, the gathering of people elsewhere than at specific places such as bus stops or taxi stands can be detected. In addition, by referring to the position information of the moving body 150 and the information outside the moving body 150, traffic congestion in the city can be monitored, or positions demanding to be allocated buses or taxis can be estimated. Therefore, the disclosure can be useful for safe use and improvements in convenience of public transportation.

In addition, the people-gathering information calculation unit 113 may estimate attributes such as age or gender or the like of each person included in the people-gathering information with reference to the information outside the moving body 150 acquired by the moving-body outside information acquisition unit 111. A detailed 3D image can be generated from the information outside the moving body 150 acquired by the outside information acquisition unit 151 using Lidar. By analyzing the detailed 3D image, the people-gathering information calculation unit 113 can distinguish whether a person is a female or a male, an adult or a child. Then, the people-gathering information calculation unit 113 may generate attribute information indicating the attributes of each person included in the people-gathering information based on an estimation result, and may include the attribute information in the people-gathering information.

According to these configurations, a gathering of people elsewhere than at specific places such as bus stops or taxi stands can be detected, and the attributes of the gathering people can be detected and included in the people-gathering information.

The map creation unit 114 acquires map information, and creates a people distribution map showing the people-gathering information at each position on a map indicated by the map information with reference to the people-gathering information calculated by the people-gathering information calculation unit 113. The map creation unit 114 may acquire the map information via, for example, the Internet, or may store the map information in advance. The map creation unit 114 may, for example, show the number of people gathering at each position on the map, or may show human-shaped icons in a dense manner. In addition, the map creation unit 114 may create a people distribution map including the attribute information indicating the number of people of each age or gender gathering at each position on the map with reference to the attribute information included in the people-gathering information.

According to these configurations, since the people distribution map showing a place where people are gathering and the number of people gathering in the place on the map is created, a gathering of people elsewhere than at specific places such as bus stops or taxi stands can be easily grasped.

Embodiment 2

Embodiment 2 of the disclosure is described below. For convenience of description, members having the same functions as those described in the above embodiment are denoted by the same reference numerals, and description thereof will not be repeated.

Figure 2:
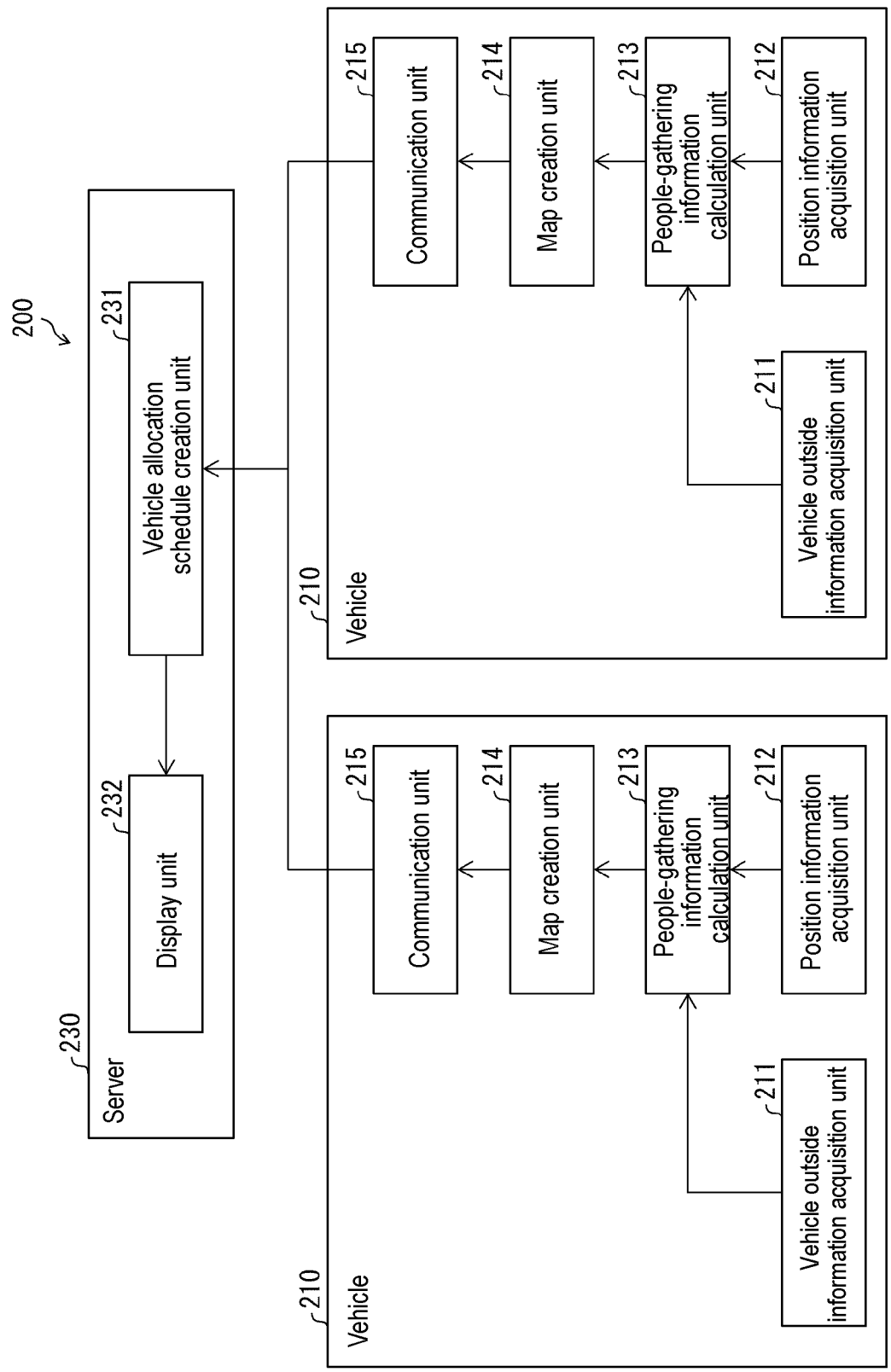
FIG. 2 is a block diagram showing a schematic configuration of a people-gathering analysis system according to Embodiment 2 of the disclosure.

FIG. 2 is a block diagram showing a schematic configuration of a people-gathering analysis system 200 according to Embodiment 2. As shown in FIG. 2, the people-gathering analysis system 200 includes a plurality of vehicles 210 and a server (movement destination prediction creation device) 230.

(Configuration of Vehicle 210)

The vehicle 210 is configured to have the functions of both the people-gathering analysis device 110 and the moving body 150 in Embodiment 1, that is, the people-gathering analysis device 110 in Embodiment 1 is configured to be provided on the moving body 150 side.

The vehicle 210 includes a vehicle outside information acquisition unit 211, a position information acquisition unit 212, a people-gathering information calculation unit 213, a map creation unit 214 and a communication unit 215.

The vehicle outside information acquisition unit 211 has the functions of both the outside information acquisition unit 151 and the moving-body outside information acquisition unit 111 of Embodiment 1, collecting information outside the vehicle 210 by, for example, Lidar, and acquiring an output from Lidar.

The position information acquisition unit 212 includes a GPS antenna, a Wi-Fi® antenna, a compass, an acceleration sensor and the like, detects and acquires the position information such as a direction in which the vehicle 210 is directed or the current position of the vehicle 210 or the like. In addition, in the case where the vehicle 210 moves while performing wireless communication, the position information acquisition unit 212 may acquire the position information of the vehicle 210 from a wireless communication base station.

With reference to the position information of the vehicle 210 acquired by the position information acquisition unit 212 and the information outside the vehicle 210 acquired by the vehicle outside information acquisition unit 211, the people-gathering information calculation unit 213 calculates the people-gathering information that associates the position information with the gathering information of people. In addition, the people-gathering information calculation unit 213 may include, in the people-gathering information, the attribute information indicating the attributes of each person included in the people-gathering information.

With reference to the people-gathering information calculated by the people-gathering information calculation unit 213, the map creation unit 214 creates a people distribution map that associates a position on a map with the number of people gathering at the position.

The communication unit 215 communicates with the server 230 via wireless communication such as, for example, the Internet. The people distribution map created by the map creation unit 214 is transmitted to the server 230 via the communication unit 215. At least one of the people distribution map created by the map creation unit 214 and the people-gathering information calculated by the people-gathering information calculation unit 213 may be configured to be transmitted to the server 230 via the communication unit 215.

(Configuration of Server 230)

The server 230 includes a vehicle allocation schedule creation unit 231 and a display unit 232. The server 230 receives at least one of the people-gathering information and the people distribution map transmitted via the communication units 215 of a plurality of the vehicles 210 via wireless communication such as, for example, the Internet.

With reference to the people-gathering information or the people distribution map received from each of the vehicles 210, the vehicle allocation schedule creation unit 231 determines a movement destination of vehicles that can be allocated, and creates a vehicle allocation schedule.

FIG. 3 and FIG. 4 are diagrams showing examples of vehicle allocation schedules created by the vehicle allocation schedule creation unit 231. As shown in FIG. 3, the vehicle allocation schedule creation unit 231 divides a measurement target area of the people-gathering analysis system 200 into a plurality of areas A to E, and creates the vehicle allocation schedule by determining a vehicle allocation ratio (%) and number of vehicles to be allocated corresponding to the vehicle allocation ratio based on the number of people in each of the areas A to E.

In addition, as shown in FIG. 4, the vehicle allocation schedule creation unit 231 may collect data for each attribute for each of the areas A to E. Based on the number of people of each attribute in each of the areas A to E, the vehicle allocation schedule creation unit 231 may create the vehicle allocation schedule by determining the vehicle allocation ratio (%) and the number of vehicles to be allocated corresponding to the vehicle allocation ratio.

For example, the vehicle allocation schedule creation unit 231 sets a weight index of an adult to 2 and a weight index of a child to 1, and calculates the weight index in each of the areas A to E. For example, in area A, since there are 15 adults and 5 children, the weight index is calculated as 15×2+5=35. According to the number of people of each attribute and the weight index in each of the areas A to E, the vehicle allocation schedule creation unit 231 determines the vehicle allocation ratio (%) and the number of vehicles to be allocated corresponding to the vehicle allocation ratio.

The display unit 232 displays the vehicle allocation schedule created by the vehicle allocation schedule creation unit 231 on a display screen.

The vehicle allocation can be performed by appropriately using a conventionally known method, and the description thereof is therefore omitted. For example, the server 230 may be capable of automatically performing vehicle allocation according to the vehicle allocation schedule created by the vehicle allocation schedule creation unit 231 and the position information of each vehicle that can be allocated. In addition, a vehicle dispatcher may perform the vehicle allocation with reference to the vehicle allocation schedule displayed on the display unit 232.

(Flow of Processing by People-Gathering Analysis System 200)

Figure 5:
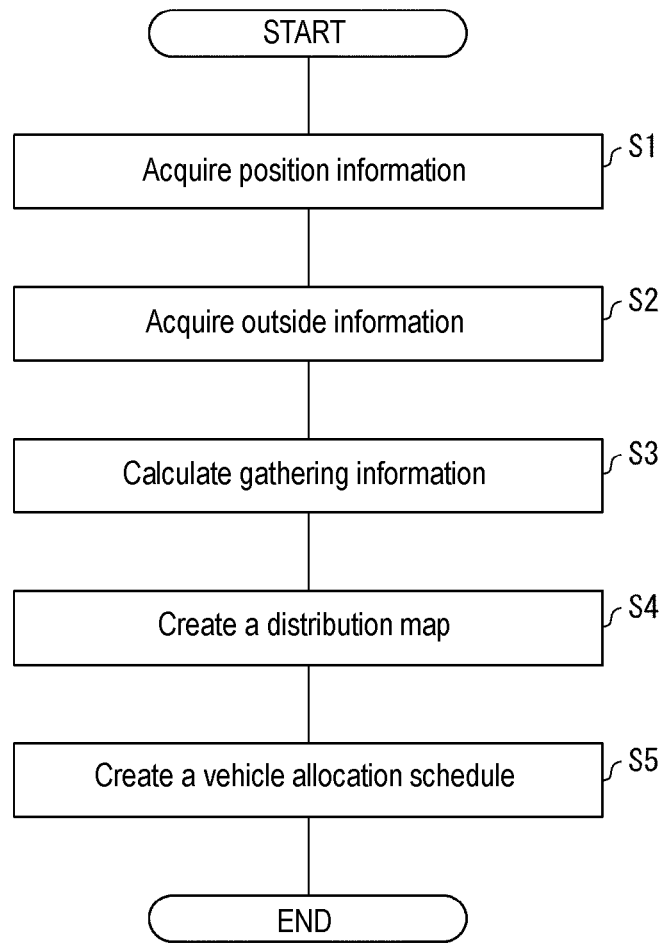
FIG. 5 is a flowchart showing a flow of processing by the people-gathering analysis system according to Embodiment 2.

A flow of vehicle allocation schedule creation processing is described with reference to FIG. 5. FIG. 5 a flowchart showing the flow of vehicle allocation schedule creation processing. The details of each processing are as described above.

(Step S1)

The position information acquisition unit 212 acquires the position information of the vehicle 210.

(Step S2)

The vehicle outside information acquisition unit 211 acquires the information outside the vehicle 210.

(Step S3)

With reference to the position information of the vehicle 210 acquired by the position information acquisition unit 212 and the information outside the vehicle 210 acquired by the vehicle outside information acquisition unit 211, the people-gathering information calculation unit 213 calculates the people-gathering information.

(Step S4)

With reference to the people-gathering information calculated by the people-gathering information calculation unit 213, the map creation unit 214 creates the people distribution map. The people distribution map created by the map creation unit 214 is transmitted to the server 230 via the communication unit 215.

(Step S5)

With reference to the acquired people distribution map, the vehicle allocation schedule creation unit 231 creates the vehicle allocation schedule.

According to these configurations, information on about how many people are gathering in which area can be collected based on the information outside a plurality of vehicles 210 and the position information of the vehicles 210. Therefore, a gathering of people elsewhere than at specific places such as bus stops or taxi stands can be detected, and a position demanding to be allocated buses or taxis can be estimated. Therefore, the disclosure can be useful for safe use and improvements in convenience of public transportation.

Embodiment 3

Embodiment 3 of the disclosure is described below. A people-gathering analysis system of Embodiment 3 is omitted from illustration, and is different from the people-gathering analysis system 200 of Embodiment 2 in that the people-gathering information calculation unit 213 and the map creation unit 214 are provided on the server 230 side.

In the people-gathering analysis system in which the people-gathering information calculation unit 213 and the map creation unit 214 are provided on the server 230 side, the server 230 acquires from a plurality of vehicles 210 the information outside the vehicles 210 and the position information of the vehicles 210 that are transmitted via the communication unit 215. With reference to the acquired information outside the vehicles 210 and position information of the vehicles 210, the people-gathering information calculation unit 213 of the server 230 calculates the people-gathering information. In addition, the map creation unit 214 of the server 230 generates the people distribution map with reference to the people-gathering information calculated by the people-gathering information calculation unit 213.

Moreover, the server 230 may be configured to acquire outside information not only from the vehicle 210 such as a bus, a taxi, a car, a motorcycle or the like but also from a moving body such as a so-called drone such as a multicopter, an unmanned aircraft or the like as well as the position information thereof, calculate the people-gathering information, and generate the people distribution map.

[Implementation Example by Software]

The functional blocks of the people-gathering analysis device 110, the vehicle 210 and the server 230 may be implemented by a logic circuit (hardware) formed on an integrated circuit (IC chip) or the like, or may be implemented by software.

In the latter case, the people-gathering analysis device 110, the vehicle 210 and the server 230 include a computer executing instructions of a program being software that realizes each function. This computer includes, for example, one or more processors, and includes a computer-readable recording medium storing the above program. In the computer, an object of the disclosure is achieved by the processor reading the program from the recording medium and executing the program. As the processor, a central processing unit (CPU), for example, can be used. As the recording medium, a "non-transitory tangible medium," for example, in addition to a read only memory (ROM), a tape, a disk, a card, a semiconductor memory, a programmable logic circuit or the like, can be used. In addition, a random access memory (RAM) or the like for developing the above program may further be included. In addition, the program may be supplied to the computer via an arbitrary transmission medium (communication network or broadcast wave, etc.) capable of transmitting the program. An aspect of the disclosure can also be implemented in the form of a data signal embedded in a carrier wave, the data signal being embodied by the above program by electronic transmission.

The disclosure is not limited to the embodiments described above, and may be modified in various ways within the scope of the claims. An embodiment derived from a proper combination of technical means disclosed in respective different embodiments is also encompassed in the technical scope of the disclosure.

What is claimed is:

1. A people-gathering analysis device comprising:
   a processor, configured to:
   acquire position information of a moving body;
   acquire information outside the moving body;
   calculate people-gathering information indicating a gathering of people with reference to the acquired position information of the moving body and the acquired information outside the moving body; and
   transmit the calculated people-gathering information to a server to create a movement destination prediction of the moving body.

2. The people-gathering analysis device according to claim 1, wherein the processor generates attribute information indicating attributes of each person that is included in the people-gathering information with reference to the acquired information outside the moving body, and includes the attribute information in the people-gathering information.

3. The people-gathering analysis device according to claim 1, wherein the processor is further configured to:
   acquire map information, and display on a map indicated by the map information a distribution state of people based on the acquired position information of the moving body and the acquired information outside the moving body.

4. The people-gathering analysis device according to claim 1, wherein
   the moving body comprises a sensor detecting outside information,
   wherein the processor acquires the information outside the moving body from the sensor.

5. A people-gathering analysis system comprising;
   a moving body;
   a people-gathering analysis device comprising:
      a processor, configured to:
      acquire position information of the moving body;
      calculate people-gathering information indicating a gathering of people with reference to the acquired information outside the moving body and the acquired position of the moving body; and
   a server that creates a movement destination prediction of the moving body from the calculated people-gathering information acquired from the people-gathering analysis device.

6. The people-gathering analysis system according to claim 5, wherein
   the moving body comprises a sensor detecting outside information,
   wherein the processor of the people-gathering analysis device acquires the information outside the moving body from the sensor of the moving body.

7. A vehicle being the moving body comprising the people-gathering analysis device according to claim 1.

8. A non-transitory computer-readable recording medium storing a people-gathering analysis program for causing a computer to function as the people-gathering analysis device according to claim 1.

* * * * *